Aug. 18, 1925.
C. BARDON
LOCK DRILL BIT
Filed May 15, 1923
1,550,333
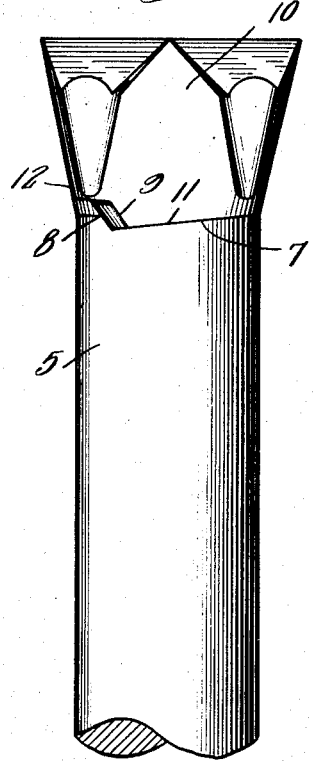
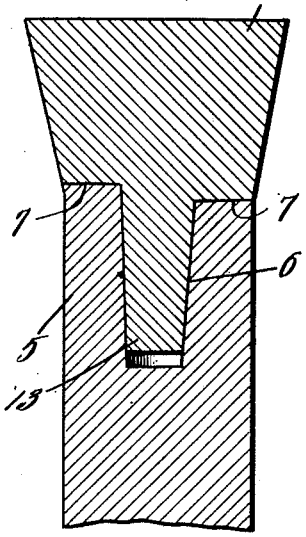
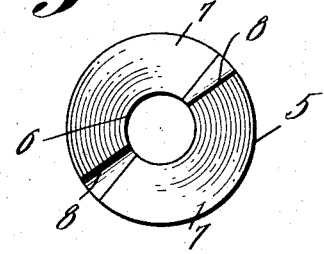
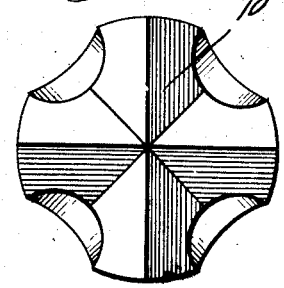
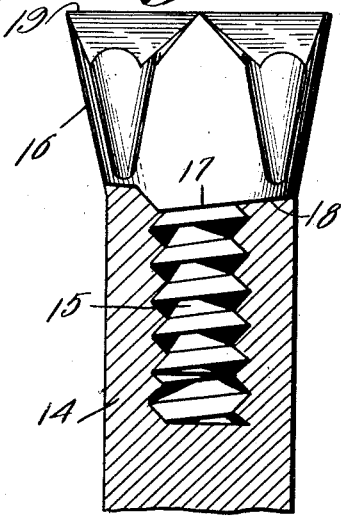
C. Bardon, Inventor Patented Aug. 18, 1925.

1,550,333

UNITED STATES PATENT OFFICE.

CLARENCE BARDON, OF ANACONDA, MONTANA.

LOCK DRILL BIT.

Application filed May 15, 1923. Serial No. 639,130.

*To all whom it may concern:*

Be it known that I, CLARENCE BARDON, a citizen of the United States, residing at Anaconda, in the county of Deerlodge and State of Montana, have invented a new and useful Lock Drill Bit, of which the following is a specification.

This invention relates to drills and more particularly drill bits, the primary object of the invention being to provide novel means for securing the drill bit to its shank.

Another object of the invention is to provide means for supporting a bit whereby the rotary movement of the drill bit, while the same is in operation, will tend to force the bit into the shank to more securely lock the bit against displacement.

A still further object of the invention is to provide a drill bit of this character which may be readily and easily released from the drill shank to facilitate the sharpening or replacing of a bit.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view disclosing a drill bit and shank constructed in accordance with the invention.

Figure 2 is a longitudinal sectional view through a drill shank and bit.

Figure 3 is an end view of a drill shank.

Figure 4 is an end elevational view of the cutting edge of the bit.

Figure 5 is an elevational view disclosing a modified form of the invention, the shank being partly in section.

Referring to the drawing in detail, the reference character 5 designates a drill shank which is formed with a tapered bore 6 extending from one end thereof. One end of the shank 5 is formed with inclined surfaces 7 that define shoulders 8 at the ends thereof. The removable drill bit is indicated at 10 and is formed with inclined surfaces 11 defining inclined end walls 9.

The drill bit is also formed with inclined edges 11 and 12 that engage the inclined edges of the shank to set up a binding action between the bit and shank and wedge the bit into close engagement with the shank. Formed on the bit 10 is a tapered extension 13 adapted to be fitted in the tapered bore of the shank to secure the bit to the shank it being obvious that since the bore 6 is of a greater length than the extension 13, a binding action will be set up between the extension 13 and wall of the bore to further secure the bit to the shank.

As shown by Figure 5 of the drawing, the shank is indicated at 14 and formed with a threaded bore to accommodate the threaded extension 15 of the bit 16, inclined walls 17 being formed on the bit to cooperate with the inclined walls 18 of the shank to relieve the threaded extension 13 of the entire strain which would ordinarily be directed thereto.

The bit is supplied with the usual cutting edges 19 which may be of any desired construction to facilitate the work of the bit.

If it is desired to remove the bit, it is obvious that by hitting one edge of the bit with a hammer or similar tool, to cause the bit to move in an anti-clockwise direction, the bit will be readily disengaged from the shank.

What is claimed as new is:—

A drill including a drill shank having a tapered bore extending from one end thereof, the end of the shank adjacent to the tapered bore being provided with cam surfaces, a shoulder forming a part of the cam surface, a removable drill bit having a tapered extension and having inclined surfaces disposed adjacent thereto, a shoulder forming a part of the inclined surfaces and adapted to engage the first mentioned shoulder to restrict movement of the bit, and said extension being tapered to conform to the shape of the bore in the shank, and said extension adapted to be wedged within the bore when the shank is rotated against the bit.

In testimony that I claim the foregoing as my own, I have hereto affixed my signature.

CLARENCE BARDON.